May 8, 1962     H. T. GOLDE     3,033,609
MOTOR VEHICLE WITH ELECTRICALLY OPERATED SLIDABLE TOP
Filed March 23, 1959     3 Sheets-Sheet 1
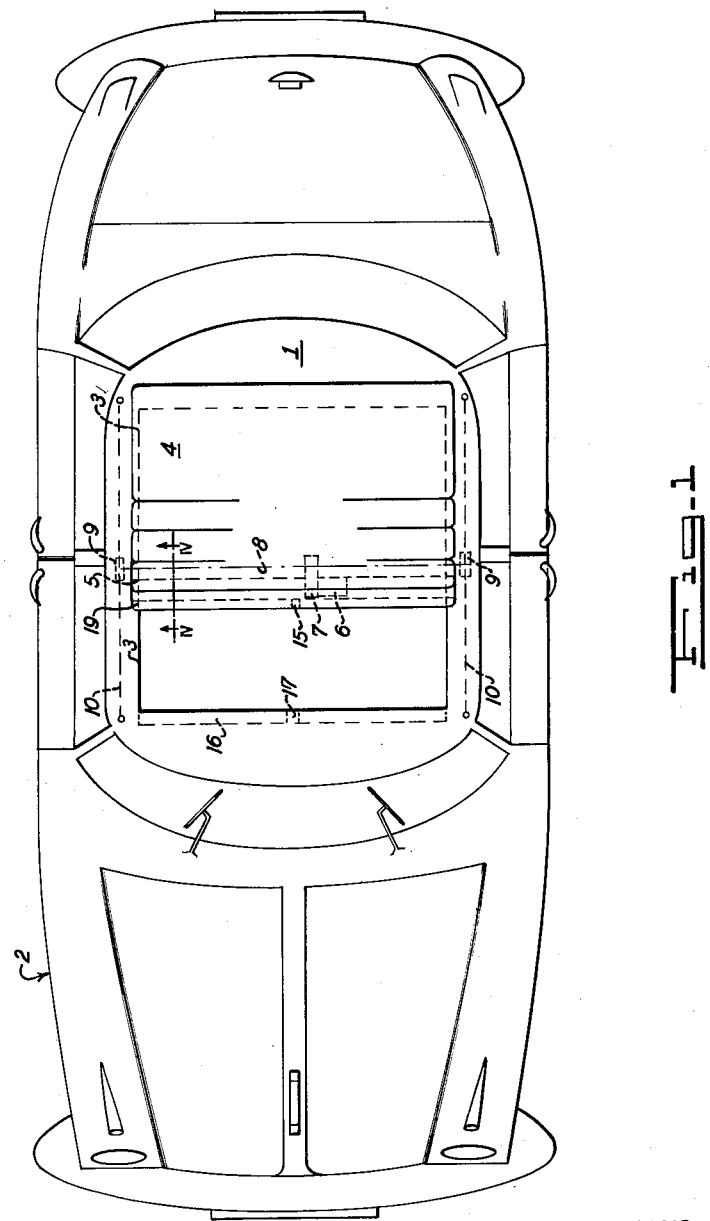
INVENTOR
HANS T. GOLDE

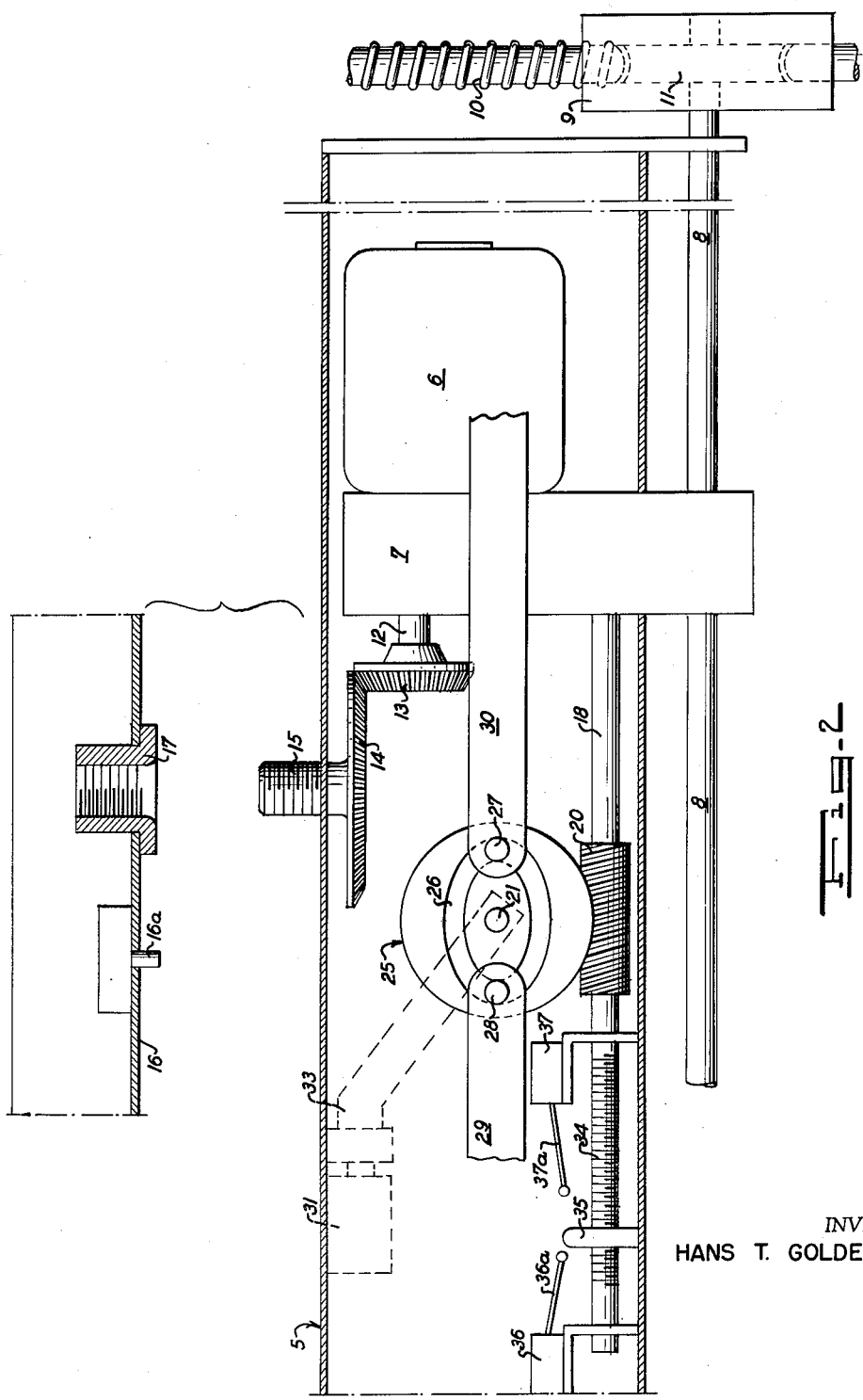

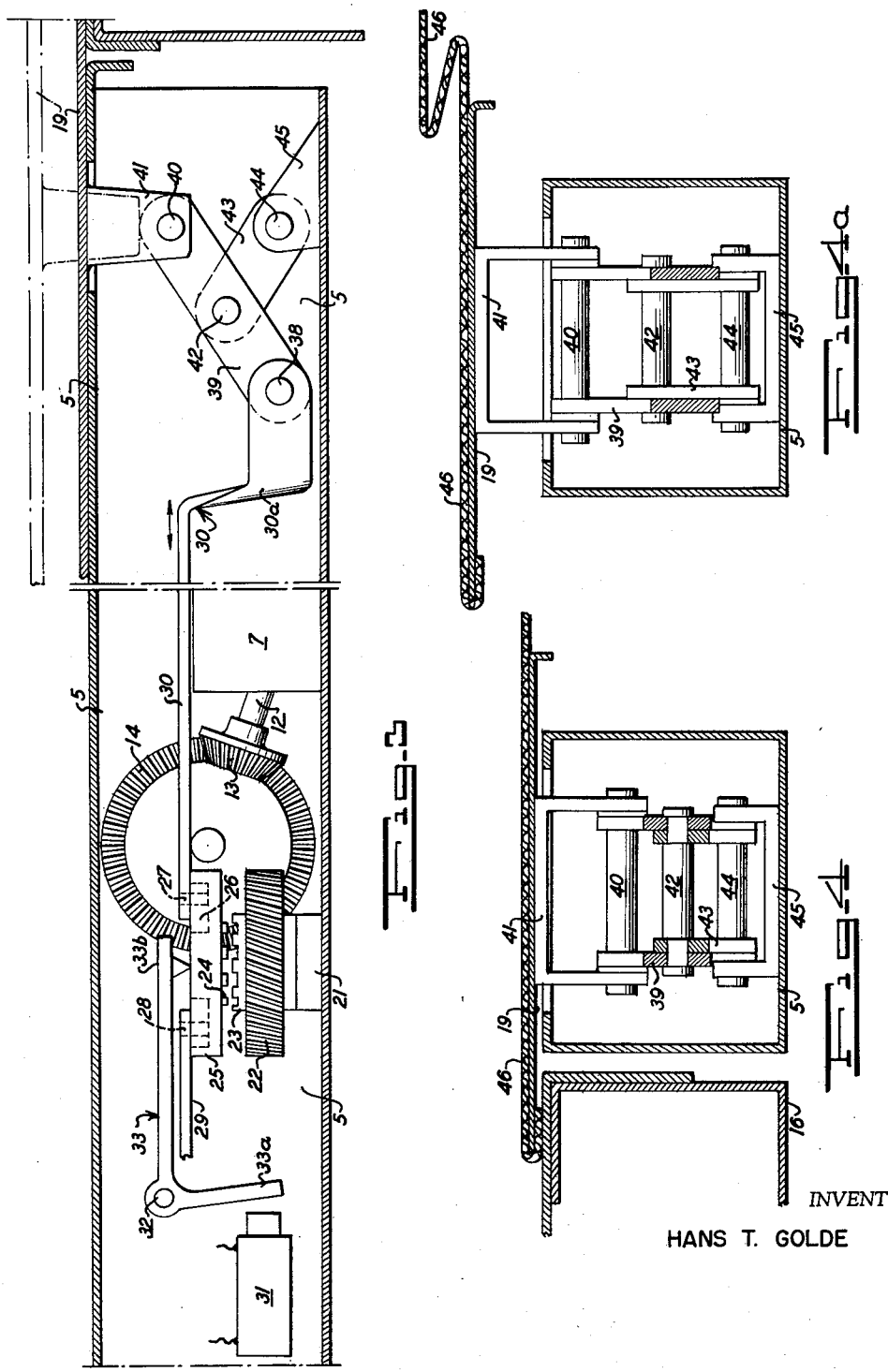

United States Patent Office 3,033,609
Patented May 8, 1962

3,033,609
MOTOR VEHICLE WITH ELECTRICALLY OPERATED SLIDABLE TOP
Hans Traugott Golde, 338 Hanauer Landstrasse, Frankfurt am Main, Germany
Filed Mar. 23, 1959, Ser. No. 801,382
Claims priority, application Germany Mar. 26, 1958
7 Claims. (Cl. 296—137)

The invention relates to motor vehicles with an aperture in the roof closable by a slidable top. The slidable top may be a slidable solid top or a slidable folding top.

Slidable tops are generally provided at their front edge with a locking device by means of which the slidable top in anchored in closed position to the front portion of the fixed roof of the vehicle. This locking device is often hand-operated but it is also known to provide an electric drive for actuating the locking device.

In the case of the known automatic drive for shifting the slidable top, the provision of an additional electric drive for the locking device is relatively expensive and the accommodation of the driving device with its feed wires requires a considerable amount of space.

Therefore the object of the invention is a simplification of the electric drive for a slidable top and for the locking device which saves space and is relatively cheap to produce.

According to the invention an electric motor is mounted on the slidable top itself and drives through the intermediary of a first shaft toothed wheels provided on both sides of the top and engaging toothed racks arranged on both sides of the aperture in the fixed roof, whereby the same electric motor drives the locking device through the intermediary of a second shaft.

Slidable folding tops generally carry at their front edge a closing cap movable substantially in the vertical direction and extending over the entire width of the folding top. When the aperture in the roof is being closed, this cap is lowered on to the front portion of the fixed roof. The lowering of the cap also effects at the same time the stretching of the material of the folding top and causes the edges of the material to bear tightly against the fixed roof of the vehicle. According to the invention, the vertical movement for the stretching of the cap in the case of slidable folding tops is effected through a stretching means and can be performed by the same motor which effects the sliding movement and the locking of the top. For this purpose a third shaft is driven by the electric motor and is coupled to the stretching means by a coupling device. As will be hereinafter described in greater detail, the coupling device preferably comprises a clutch between the third shaft and the stretching means so that the latter is rendered operative only during a portion of the rotary movement of the third shaft.

The invention therefore provides for a fully automatic drive of all the elements necessary for opening and closing a slidable top by a single electric motor mounted on the slidable top itself and driving at least two shafts through suitable gearing.

The toothed racks and pinions for displacing the slidable top can be constructed in known manner as worm gearing, whereby a cable provided with a screw thread can serve as a toothed rack. The invention is, however, not dependent upon any particular construction of drive transmission and it may be of any suitable type enabling the drive to be effected by a motor mounted on the slidable top.

An embodiment of the invention is hereinafter described in detail by way of example with reference to the accompanying drawings, in which FIG. 1 is a diagrammatic top plan view of a vehicle fitted with a slidable top according to the invention;

FIG. 2 shows by way of example the arrangement of the driving means in the front cross-bar of the slidable top, viewed from above;

FIG. 3 is a diagrammatic rear view of the front cross-bar illustrated in FIG. 2;

FIG. 4 is a cross-section through the front cross-bar and the front roof frame, when the slidable top is in its closed position, and FIG. 4a is a section through the front cross-bar, taken on line IV—IV of FIG. 1.

According to FIG. 1 the roof 1 of a motor vehicle 2 is provided with an aperture 3 which can be closed by a slidable top 4. This slidable top is guided in side rails arranged parallel to the side edges of the aperture in the roof which are omitted from the drawing for the sake of clarity. The driving means for the top is mounted on a front cross bar 5 of the slidable top and said cross-bar extends across the under side of the slidable top transversely to the direction in which it is slidable. The front cross-bar supports an electric motor 6 and transmission gearing 7 which drives three shafts. The shafts may be driven at different speeds. The respective shafts are:

(1) A shaft 8 which actuates the slidable top causing it to move along a toothed rack 10 through the intermediary of a mechanism 9 which may consist, for example, of a pinion 11 engaging the rack 10;

(2) A shaft 12 cooperating with a locking device through the intermediary of two bevel gears 13 and 14 whereby the slidable top 4 is locked in its closed position on the front transverse portion 16 of the roof frame, and (3) A shaft 18 which actuates the cap 19 through the intermediary of gearing and transmission means coordinated thereto.

The transmission gearing 7, which reduces the relatively high speed of the electric motor 6, drives the shaft 8 which is mounted on the slidable top 4. A pinion 11, keyed on the shaft 8, engages a rack rigidly connected with the fixed roof 1 of the vehicle and which extends parallel to the guide rails on which the slidable top is guided. In the drawing the rack is shown in the form of a screw spindle or threaded cable 10. The pinion 11 mounted in a housing 9 meshes with the screw thread of the spindle or cable 10. The housing 9 has a through-bore designed to receive and guide the spindle or cable 10. The step-down of this shaft by the reduction gearing 7 is chosen so that the slidable top 4 is shifted at a desired speed.

The shaft 12 at the output end of the reduction gearing 7 carries a bevel wheel 13 meshing with another bevel wheel 14. The step-down of shaft 12 in relation to the running speed of the electric motor 6 and the dimensions of the bevel wheels 13 and 14 are so calculated that a screw spindle 15 connected with the bevel wheel 14 and mounted with bevel wheel 14 on the front cross-bar 5 of the slidable top, is driven at a relatively low speed and consequently with great power. This threaded spindle or screw 15 meshes with a counter screw thread 17 which is illustrated as a screw-threaded sleeve in FIG. 2. By the engagement of the screw 15 in the threaded sleeve 17, which is rigidly connected with the front roof frame 16, the front cross-bar 5 is drawn tightly against the front roof frame 16 and thereby effects the locking of the slidable top, securing it against unintentional displacement. When the front cross-bar 5 bears tightly against the front roof frame 16 the electric motor 6 can be switched off by a push-button switch 16a. Switching devices of this type are known and do not form part of the present invention.

A worm gear 20 is mounted on the shaft 18 and drives a worm wheel 22 freely rotatable on a shaft 21. A coupling device constituted by a claw clutch connects the stretching means to the drive through worm wheel 22, worm 20 and shaft 18. One half 23 of the claw clutch is rigidly connected with the worm wheel 22 whereas the other half 24 of this claw clutch is rigidly connected with a disk 25. This disk 25 has, for example, an elliptical groove 26 constituting a cam to guide two pins 27 and 28. The pins 27 and 28 are connected with push rods 29, 30 which in turn actuate the cap 19 through the intermediary of a device hereinafter described. The push rods 29, 30 are cranked and twisted through an angle of 90° as shown at 30a. Engagement of the clutch 23, 24 is resisted by the action of a spiral spring, which is not shown. The clutch is engaged upon energization of electromagnet 31 which causes displacement of arm 33b of a bell-crank lever 33 which is oscillatable on a shaft 32.

The front cap 19 of the slidable top is displaced only when the slidable top approaches its closed position. To accomplish this a special switching device is provided for energizing the electromagnet 31. A slide 35 with an internal screw thread rides on a screw threaded portion 34 of the shaft 18. During shifting of the top from one position, for example its fully open position, into the other position, for example its fully closed position, this slide is shifted along almost the entire length of the screw threaded portion 34 of the shaft 18. The slide 35 is secured against rotation by a foot which slides on a guide, for example one of the lateral surfaces of the front cross-bar. Two switches 36 and 37 are arranged above the screw threaded portion 34 of the shaft 18 so that feeler or contact levers 36a and 37a of the switches are in the path of movement of the slide 35.

If the slidable top moves, for example, in the direction towards its closed position, the slide 35 lifts feeler lever 37a of the switch 37 when the slidable top has reached a certain point near its extreme position. Thereby the electromagnet 31 is energized by a source of current, which is not shown but may, for example, be the battery of the motor vehicle, whereupon the arm 33a of the bell-crank lever 33 is attracted by the magnetic effect. The other arm 33b of the bell-crank lever 33 thereby presses the cam disk downwards so that the claws of the clutch halves 23, 24 come into engagement and the cam disk is caused to rotate. As a result the push rods 30 are shifted in a direction transverse to the direction of travel of the slidable top. The outer end of each of the push rods 29, 30 is connected at 38 to one end of a link 39, the other end of which is connected at 40 to a flange 41 of the cap 19. A second link 43, connected at 44 to a flange 45 of the front cross-bar 5, engages a hinge pin 42 approximately in the middle of the link 39. From FIG. 3 it will be seen that when the push rods 30 are in the position indicated in solid lines the cap 19 assumes its lowermost position shown in FIG. 4 and thereby rests firmly against the fixed roof 1 of the vehicle or the front roof frame 16 and the front cross-bar 5 and the slidable top material 46 bears snugly and tightly on the fixed roof 1 of the vehicle. If the push rods 29, 30 are moved into the position indicated in broken lines in FIG. 3, the cap is raised into the position shown in FIG. 4a and indicated in broken lines in FIG. 3. In this position it is then possible to shift the slidable top without the material of the top dragging on the fixed roof of the vehicle.

The locking device pulls the top at a position near its closed position over the last portion of its closing path into its final closed position against the resistance offered by the material of the top, the slidable top being held firmly on the roof frame and the material of the top being stretched taut. Shortly before the locking takes place and as soon as the cap has reached its lowered position, the slide 35 lifts the feeler lever 36a of the switch 36 and thereby actuates the switch 36 with the result that the electromagnet is deenergized. During this time the cam disk 25 has turned through an angle of 90°, that is the cap has been lowered out of its raised position and in descending stretches the cover or top material. The drive of the cap 19 is then disengaged in this position and the cap assumes its final position namely the lowered position shown in FIG. 4, and remains there until the roof is again opened.

In the embodiment described, a known worm or threaded cable is used as toothed rack 10 and a suitably toothed worm wheel serves as pinion 11. It will be seen that this toothed rack can be formed in any desired way, providing a positive connection is established between the driving shaft and this toothed rack element 10 which is capable of effecting the shifting of the slidable top for the purpose of opening and closing.

It is evident that other embodiments are possible within the scope of the invention. Thus, for example, the locking device may consist of known locking hooks. Moreover the drive of the cap may be effected by a suitable device instead of the cam disk 25.

In the drawings the invention is illustrated as applied to a slidable folding top. It is obvious, however, that it is not restricted to such a slidable folding top but can also be used in a similar manner for a rigid slidable top which also has a front cross-bar or some other similar stiffening element. When employed on a rigid slidable top, the cap 19 is not necessary so that the driving mechanism will be simplified accordingly.

It is also evident that the drive of the shaft 12 and consequently of the roof locking device 15 need not be effected over the entire path of movement of the sliding top but can be actuated during the drive of the shaft 12 by a clutch actuated by the switching device 34 to 37, in a similar manner to that described in connection with the drive for the push-rods 29, 30. In this case the drive of the locking device 15 during closing of the slidable top will only be actuated when the slidable top approaches its closed position. Similarly, the locking device 15 will only be actuated during the initial opening of the slidable top, the locking device being deactuated after the top is withdrawn from the closed position.

I claim:

1. A vehicle comprising a slidable roof, means for opening and closing the roof, means for locking the roof in closed position, stretching means movable between first and second positions and operatively associated with said roof whereby the same is relaxed in the first position and stretched in the second position, a common drive coupled to all of said means for operating the same; said drive comprising a motor, gearing coupled to said motor, a coupling device connecting said gearing to the stretching means, and switching means operatively associated with said coupling device to activate the same when said roof is spaced a determinable distance from its closed position and maintaining the same activated until the stretching means moves from the first to the second position.

2. A vehicle as claimed in claim 1 wherein the means for opening and closing the roof comprises a shaft driven by said gearing, gears on said shaft, the vehicle further comprising worm cables extending longitudinally along the vehicle, said gears on the shaft engaging the cables.

3. A vehicle as claimed in claim 1, wherein the locking means comprises a threaded member on said roof, the vehicle further comprising a threaded receptacle engageable with said threaded member, said threaded member being connected to said gearing.

4. A vehicle as claimed in claim 1 wherein said drive and said all of said means coupled to the drive are mounted on said roof.

5. A vehicle as claimed in claim 1 wherein the stretching means comprises a lever system and a cam disc controlling the lever system, the cam disc being driven by said gearing with said coupling device activated.

6. A vehicle as claimed in claim 1, wherein said roof is foldable, the vehicle further comprising a cap on the roof attached to said stretching means and adapted for vertical displacement.

7. A vehicle as claimed in claim 6 wherein said switching means includes an electromagnet which is energized in response to the position of said roof, means operatively associated with said electromagnet and coupled to said coupling device for activating the latter in response to energization of said electromagnet.

References Cited in the file of this patent

UNITED STATES PATENTS

| | | |
|---|---|---|
| 2,741,503 | Thompson | Apr. 10, 1956 |
| 2,753,202 | Smith et al. | July 3, 1956 |
| 2,872,243 | Golde et al. | Feb. 3, 1959 |

FOREIGN PATENTS

| | | |
|---|---|---|
| 168,917 | Austria | Sept. 25, 1951 |
| 1,012,834 | Germany | July 25, 1957 |
| 683,477 | Great Britain | Nov. 26, 1952 |